United States Patent
Jacobson

[15] 3,643,369
[45] Feb. 22, 1972

[54] FISH LURE

[72] Inventor: Earl D. Jacobson, 2037 West 4200 South, Roy, Utah 84067

[22] Filed: June 8, 1970

[21] Appl. No.: 44,203

[52] U.S. Cl. ............................................43/42.03, 43/42.5
[51] Int. Cl. ......................................................A01k 85/00
[58] Field of Search ......................43/42.03, 42.02, 42.5, 42

[56] References Cited

UNITED STATES PATENTS

| | | | |
|---|---|---|---|
| 2,394,132 | 2/1946 | Zeibig | 43/42.5 |
| 1,585,943 | 5/1926 | Streich | 43/42.5 X |
| 2,780,884 | 2/1957 | Hatfield | 43/42.5 |
| 3,497,986 | 3/1970 | Bianco | 43/42.5 |

FOREIGN PATENTS OR APPLICATIONS

| | | | |
|---|---|---|---|
| 59,407 | 1/1954 | France | 43/42.5 |

*Primary Examiner*—Melvin D. Rein
*Attorney*—B. Deon Criddle

[57] ABSTRACT

A fish lure having a body section formed of very thin, high-tensile strength, but flexible sheet metal. The body is shaped to provide a three-dimensioned perspective representation of a small bait fish. The body has upturned side flanges to serve as stiffeners for a portion of the body, the side flanges extending from a point just rearward of the leading edge of the nose to a point not exceeding one-half of the overall length of the body, the said flanges functioning to generally funnel water over the central portion thereof as it is traveled through water and the tail is dropped, whereby impinging water repeatedly flexes it up until it is repeatedly contacted and forced down by the funneled water.

2 Claims, 5 Drawing Figures

INVENTOR:
Earl D. Jacobson

BY: B. Dean Gribble

ATTORNEY 3,643,369

FISH LURE

BRIEF DESCRIPTION OF THE INVENTION

1. Field of the Invention

This invention relates to fishing lures and is particularly concerned with such lures as may artificially simulate actual live bait movement and appearance and that can be produced at relatively low cost, when compared to others available on the market.

2. Prior Art

There have, in the past, been a great many fish lures developed. Most of these have rigid heavy body sections, to which other such components may be loosely attached. Some have had some degree of flexiblity, and some are made of lightweight materials shaped to generally simulate live bait and so that they will move in water in a manner reminiscent of the live bait they simulate.

U.S. Pat. No. 3,497,986, for example, shows a lightweight lure shaped somewhat like a small fish and designed to move through water in such a way as to simulate some fish movements.

However, to the best of my knowledge, there has not heretofore been developed a fish lure made of a very thin, lightweight, high tensile strength, but flexible sheet material, that will simulate fish movement in directional travel and overall body rotational movement but that will also have an oscillating tail movement as the lure is moved through the water.

BRIEF SUMMARY OF THE INVENTION

Objects of the present invention are to provide a low-cost fish lure that not only will simulate small fish movement in directional travel and overall body rotational movement but that will also be flexible enough to give independent motion to segments of the body section, and especially the tail segment. Another object is to provide such a fish lure wherein the attachment for the lure to the line is arranged to insure proper movement of the lure through the water as it is used, whereby the tail segment of the body will oscillate with respect to the remainder thereof.

Still other objects are to provide a lure so light that it can be used with even very light fishing tackle; that will, when properly cast, ride on top of the water before slowly settling down into the water; that will have erratic, lifelike movements whether retrieved slowly or rapidly and whenever movement is induced by even slow water movement; that will be strong enough to hold against the pull of even a large fish; and that will, because of its flexiblity, assist in setting the hook attached thereto when it is taken by a fish.

Principal features of the invention include its one-piece, very thin construction; the flexibility of the strong sheet material from which it is made, its curved body configuration that insures water impingement on a downwardly curved body section; its upwardly curved side flanges arranged to channel water above the body such that tail oscillation results; and its attachment mounting positioned intermediate the uppermost portion of the body and the downwardly curved nose so that both the impinging water beneath and the channeled water above the body will properly act to oscillate the tail section.

Other objects and features of the invention will become apparent from the following detailed specification and claims, taken in conjunction with the accompanying drawing.

THE DRAWING

In the drawings:

FIG. 1 is a top plan view of the fish lure of the invention;

FIG. 2, a side elevation view with alternate body positions shown in dotted lines;

FIG. 3, a front elevation view;

FIG. 4, a vertical section, taken on the line 4—4 of FIG. 2; and

FIG. 5, a view like that of FIG. 4, but taken on the line 5—5 of FIG. 2.

DETAILED DESCRIPTION

Figure 1:
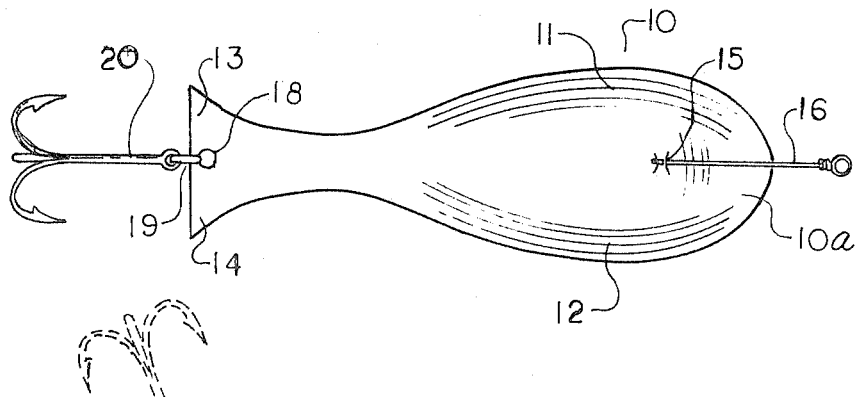
Figure 2:
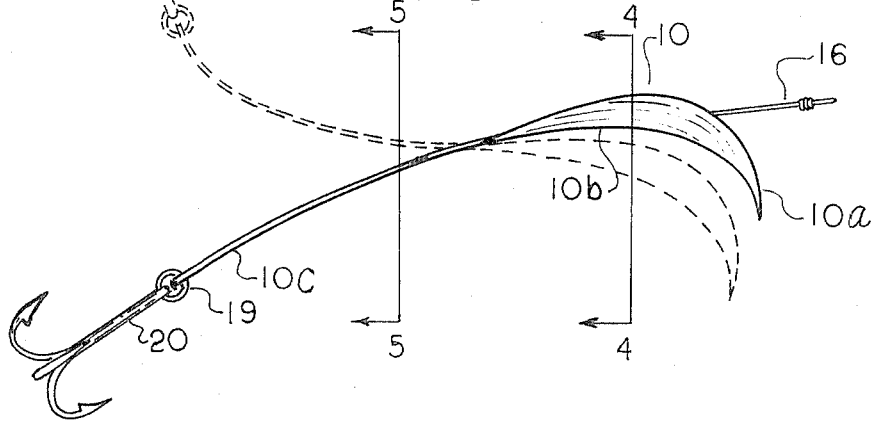
Figure 3:
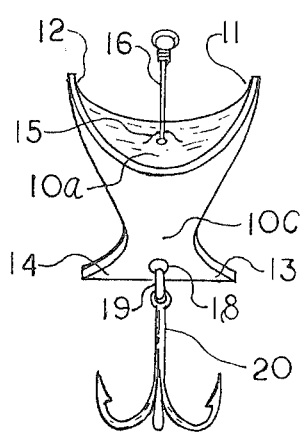
Figure 4:
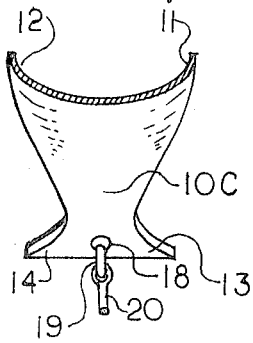
Figure 5:
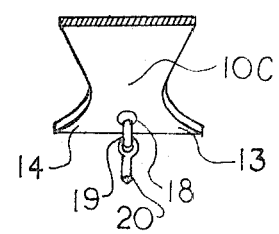

Referring now to the drawings:

In the illustrated preferred embodiment, the fish lure of the invention includes a body, shown generally at 10 and including a downturned nose portion 10a, a curved central portion 10b, having upturned lateral edges or side flanges 11 and 12 and a downwardly extending essentially flat tail section 10c. The nose section is rounded at its leading edge, which curves integrally into the edges of the central body section and the edges of the body section taper, into narrowed edges of the tail section, which then flare outwardly to form sharply pointed tail fins 13 and 14.

The upturned lateral edges start just rearwardly of the nose and curve upwardly, reaching a maximum height just forwardly of the uppermost segment of the curved central portion and then curve smoothly into the edges of the flat tail section. The upturned edges extend no more than one-half of the overall length of the lure to insure proper tail oscillation as will be hereinafter more fully explained.

Approximately one-half of the distance between the leading edge of the nosepiece and the uppermost curved central portion, and on the upper surface 10a of the body 10 there is formed an attachment means 15, to which a conventional hook-type connector 16 may be attached. Obviously, a swivel or other conventional device could as well be used in lieu of the hook connector 16, shown. The positioning of the attachment means 15 which may comprise an upset portion of the material from which the body is made, is also important to achieve proper tail actuation, as will be more fully described.

While other materials may prove satisfactory for construction of the lure in the future, it is presently preferred to make it from 1090 clock spring steel having a thickness of from between 0.003 inch and 0.010 inch. The lure is stamped to shape and is heat-treated to set the stamped contour and to insure that the contour will be retained even when the lure is subjected to severe use. Thereafter, or before the heat treatment, if desired, the lure is painted or plated to desired color.

The spring steel mentioned above has been found to be very satisfactory because of its resiliency, strength and weight. However, if made thinner than 0.003 inch it is subject to cracking during use and if made thicker than 0.010 inch it does not have the requisite flexibility.

In use, a fisherman will service his line to connector 16 and the lure will be cast and retrieved, or possibly used for trolling purposes. In any event, as the lure is pulled through the water it will generally be with the nose tipped slightly down and the tail extending downwardly until the flared tail fins 13 and 14 are below the end of the nose. Thus, as the lure is moved through the water, water beneath the nose section will act on the tail section, tending to bend it upwardly with respect to the body section.

At the same time, water is acting directly on the central portion from above, tending to hold it down. The water above the central section is channeled by the upwardly extending side flanges and the relative movement of the lure and the water results in an apparent flow of the channeled water a spaced distance above the tail section. This causes a somewhat reduced pressure directly above the tail section and allows it to bend upwardly under the influence of the water impinging thereon from beneath. The tail section bends until it is contacted by the channeled flow of water which then acts with the natural resiliency of the material to move the tail down. The bending and return process is continually repeated, thereby giving an oscillating effect to the tail section.

The upwardly extending side flanges 11 and 12 provide water channels as has been described. In addition, they provide reinforcement strength and rigidity to the forward portion of the lure and they give a more effective three-dimensional appearance to the lure by increasing the profile thickness. However, as has been noted, the flanges cannot extend more than about one-half of the body length or the tail section will be too rigid and will not properly bend when contacted from beneath by water.

The positioning of the attachment means 15 is important to insure that the lure will be moved at an angle such that the flat tail section will be contacted from beneath by water and water will be properly channeled by the side flanges to insure oscillation.

While the tail oscillation is important to the success of the lure, it should also be obvious that because of its shape and lightweight the lure will move erratically through the water. This also is important to the success of the lure since it is well known that such movements are attractive to fish.

A hole 18 is provided centrally through the tail section and close to the rear of the body to receive a ring 19 attached to a hook 20 or leader line, not shown.

Although a preferred embodiment of my invention has been herein described, it is to be understood that the present disclosure is made by way of example and that variations are possible without departing from the scope of the hereinafter claimed subject matter, which subject matter I regard as my invention.

I claim:

1. A fish lure comprising
   a one-piece body of high tensile, flexible sheet material having
      a top surface and a bottom surface;
      a downturned nose section;
      a curved central section extending upwardly and rearwardly from the nose section;
      a flat tail section extending rearwardly from a narrow connection with the curved central section and flaring outwardly to form tail fins at the rearmost portion thereof and having a hole therethrough adjacent the rearmost edge of the tail section and centrally of the tail fins;
   side flanges starting just rearwardly of the leading edge of the nose section and curving rearwardly to a point not exceeding one-half of the overall length of the body, said flanges extending upwardly from the body a maximum distance just forward of the uppermost portion of the curved central section and being tapered to join with the edges of the flat tail section; and
   an attachment means formed in the upper surface of the body at a point about midway between the leading edge of the nosepiece and the uppermost portion of the curved central section.

2. A fish lure as in claim 1, wherein the body is made of spring steel having a thickness of between about 0.003 inch and 0.010 inch.

* * * * *